Figure 1:
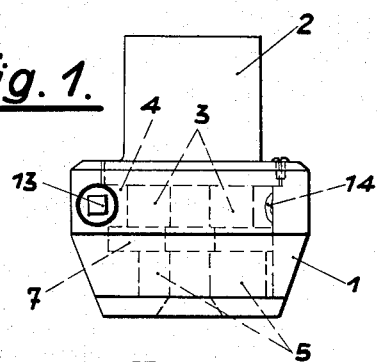

April 17, 1956   O. BILZ   2,742,297
CHUCK WITH TWO LONGITUDINALLY SPACED FIXING POINTS
Filed July 30, 1951   2 Sheets-Sheet 1

INVENTOR:
OTTO BILZ
By: Young, Emery & Thompson
Attys

April 17, 1956            O. BILZ            2,742,297
CHUCK WITH TWO LONGITUDINALLY SPACED FIXING POINTS
Filed July 30, 1951            2 Sheets—Sheet 2
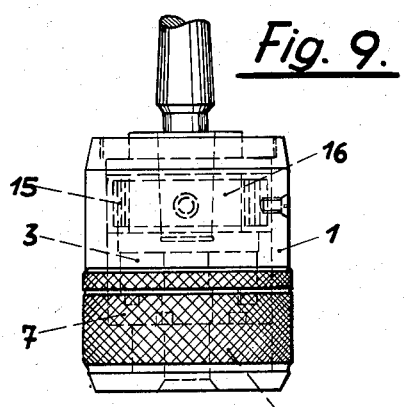
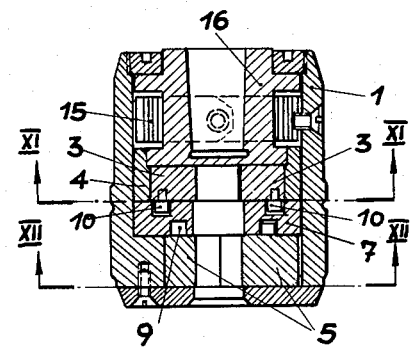
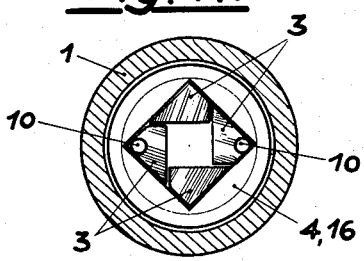
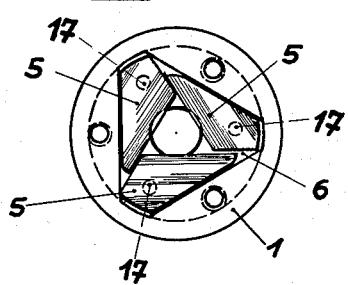
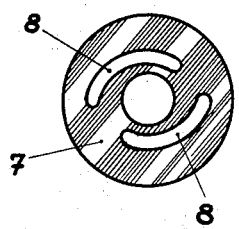
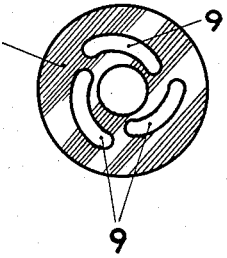
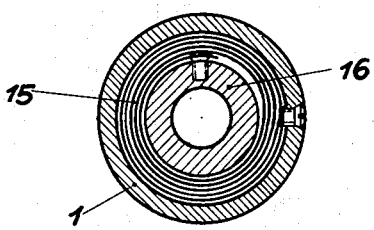
INVENTOR:
OTTO BILZ
By: Young, Emery & Thompson
Attys.

United States Patent Office 2,742,297
Patented Apr. 17, 1956

2,742,297
CHUCK WITH TWO LONGITUDINALLY SPACED FIXING POINTS

Otto Bilz, Esslingen, Wurttemberg, Germany

Application July 30, 1951, Serial No. 239,218

Claims priority, application Germany August 7, 1950

6 Claims. (Cl. 279—66)

The present invention relates to chucks designed to clamp the tool in a machine-tool, for example a drill. The invention has special reference to chucks with two clamping points in line, which are connected to a co-axially mounted coupling part and are jointly operated. Chucks of this type are designed especially for the purpose of clamping tools having a cylindrical shaft with a square end thereon.

Conventional constructions provide only two jaws for clamping the square end. These jaws are highly stressed and hence are subject to rapid wear, so that a tight fastening of the tool is not attained. They have the further disadvantage of being displaced in longitudinal direction when operated. Moreover, the case which encloses the gripping jaws, is fixed to the reception taper of the chuck simply at the external end of the case, and that by means of a thread it guides the chuck insufficiently and takes the full clamping load. Hence it wears out rapidly and, as a result, renders correct centering impossible.

The present invention refers to a chuck which does not offer the above mentioned draw-back.

The chuck comprises a housing in which two disks of circular shape are provided, spaced from each other in the axial direction of the chuck and two sets of clamping members adapted to be jointly operated and each arranged operatively in an opening of one of these disks. A connection disk is also provided interposed co-axially between said sets and operatively connected with each of these sets.

The two sets of jaws are connected by means of slots and pins sliding in said slots.

The set of clamping members for centering the tool may be composed of substantially prismatic jaws which slide in an opening of substantially equilateral or triangular shape in a reception ring and enclose a free space of variable width but invariable shape of an equilateral triangle. The jaws have essentially prismatic shape. The base of the prism viewed in the longitudinal direction of the chuck is a triangle with one angle cut. One of the sides forming the cut angle slides along one inner surface of the triangular opening, the other slides along the centering surface of an adjacent jaw. The third side of the jaw is in contact with the shaft of the tool and with one side of the second adjacent jaw.

The second set of jaws gripping the square part of the tool comprises four clamping jaws sliding along each other in the square opening of a reception disk.

Their shape is equally prismatic, and their base, viewed in the direction of the center line of the chuck, is a triangle with the point of one angle cut-off.

The chuck may be designed to be operated by a worm-gear. To this end, the reception disk of one set of jaws is a worm-wheel which meshes with a worm supported by the chuck housing and operated by means of a wrench.

A further modification of the chuck mechanism provides first a reception disk tightly fixed to a rotatable member providing the taper of the chuck, and secondly a spiral spring tending to close the two sets of clamping devices. One end of the spring is attached to the rotable member and the opposite end is fixed to the rotable housing of the sets of jaw.

Figure 2:
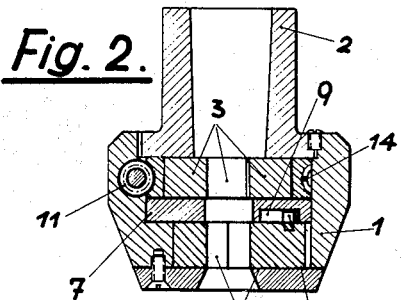
Figure 3:
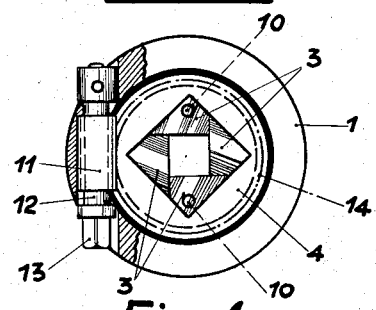
Figure 5:
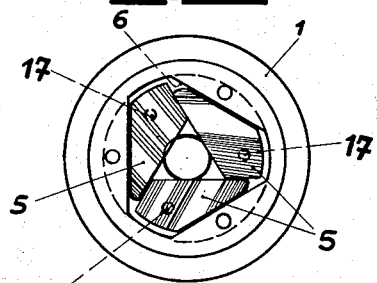
Figure 4:
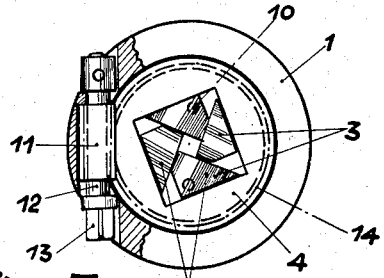
Figure 6:
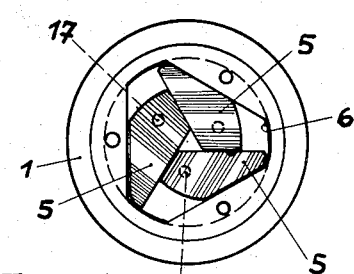
Figure 7:
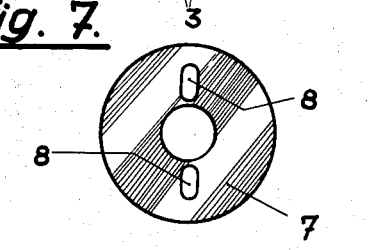
Figure 8:
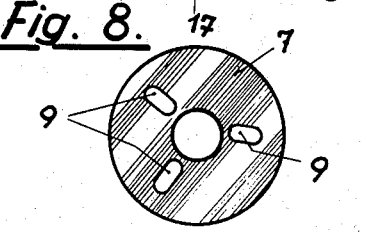

Two embodiments of the invention are represented in the accompanying drawings, in which:

Figs. 1 to 8 represent the first embodiment, viz:

Figs. 1 and 2 a side view and a sectional view of the chuck,

Figs. 3 and 4 top views of the first clamping members, with the clamping jaws opened and closed, Figs. 5 and 6 top views of the second clamping members, Figs. 7 and 8 plan views of both sides of the intermediate coupling disk, Figs 9 to 15 represent the second embodiment, viz:

Figs. 9 and 10 a side view and a sectional view taken on the center line of the chuck, Fig. 11 a sectional view of the first clamping members, the housing taken on the line XI—XI of Fig. 10.

Fig. 12 a plan view of the second clamping members taken in the direction of the arrows XII—XII of Fig. 10, Figs. 13 and 14 plan views of both sides of the intermediate coupling disk, and Fig. 15 a cross-sectional view of the spring.

A chuck according to Figs. 1 to 8 comprises a housing 1 screwed on a hub 2 which has an internal taper. The housing 1 encloses two clamping devices, the first of which grips the square part of the tool. It consists of four jaws 3 to form a square opening between them to receive the square part of the tool. When the chuck is operated, the width of the square opening decreases until the jaws 3 come into contact with the square part of the tool (see Figs. 3 and 4). The jaws 3 are located in the square-shaped opening of the reception disk 4 enclosed in the housing 1. The reception disk 4 can be operated by hand.

The second clamping device is adapted to receive the cylindrical shaft of the tool. It consists of three jaws 5 shaped to leave a free passage between them, which has the form of an equilateral triangle. By operating the jaws, the free passage may be contratced until the inner surfaces of the jaws come into contact with the shaft of the tool (see Figs. 5 and 6). The jaws 5 are disposed in a substantially triangular opening 6 of the housing 1 and slide with their back surfaces along the plane sides of the opening 6.

The two sets of jaws 3 and 5 are connected to an intermediate coupling disk 7 enclosed in the housing 1. There are slots 8 and 9 cut on both sides of the intermediate coupling part 7. These slots guide pin 10 and 17 projecting out of the jaws 3 and 5 respectively.

The disk shown in Figs. 7 and 8 is constructed in such a way that pins 10 will project into the opposite slots 8 in one or the upper side with the pins 10 being secured in the jaws 3. On the other or bottom side of the disk 7 there are three slots 9 spaced 120° from each other into which pins 17 project which latter are secured in the individual sides of the jaws 5. Likewise it can naturally be obvious, that the pins are not mounted in the individual jaws, but are mounted on the upper side and the bottom side of the disk and project into suitable slots in the sides of the jaws 3 and 5.

According to frictional conditions and to the existing dimensions of the clamped tool, the two sets of jaws 3 and 5 work simultaneously or one after the other, by rotating the disk 4. When the reception disk 4 is rotated, the jaws 3 slide along their guiding surfaces due to the disk 7.

If the jaws 3 are adjusted and as soon as they contact the tool, the set of jaws as a whole rotates together with the reception disk 4, which, carries along the pins 17 projecting into the slots 9 on the reverse side of the disk 7. Hence the jaws 5 slide along the inner surfaces of the opening 6 in the housing 1, and close around the shaft of the tool.

If the jaws 3 rest in position when the chuck is operated, then owing to the coupling effect of the disk 7, the jaws 5 are operated first: the pins 10 of the jaws 3 turn the disk 7; and the slots 9, on their part, take along the pins 17 of the jaws 5. As soon as the jaws 5 contact the tool, the disk 7 stops its motion. The pins 10 likewise are prevented from rotating and hence the jaws 3 close themselves.

Under certain conditions it may occur, that both sets of jaws work simultaneously.

The structure of the present invention according to Figs. 1 to 8 provides a joint operation of the jaws 3 and 5 by means of a worm 11, supported, unshiftable in the direction of its axis, by the housing 1. The axle 12 of the worm projects out of the housing and carries a square end, which is turned by a wrench. The worm 11 engages with a gear 14 cut into the circumferential surface of the disk 4. The gear, being self-locking, prevents the jaws 3 and 5 from rotating by themselves.

The Figs. 9 to 15 represent a second mode of carrying out the present invention. It differs from the structure already described as to the mechanism of operating the jaws. A spiral spring 15 is located behind the jaws 3 and around the core of the chuck. One end of the spring is fastened to the supporting hub 16 which forms an integral part with the reception disk 4 of the adjacent jaws 3 and with the taper portion of the chuck housing. The other end of the spiral spring is fixed to the housing 1. The spring tends to close the jaws 3 and 5 when released out of the stretched position.

When a tool is to be clamped, one turns the housing in the direction to tension the spring 15, whereby the jaws 3 and 5 are opened. After having inserted the tool, one releases the housing. Owing to the elastic force of the spring, it is rotated in the reverse direction, whereby the jaws 3 are closed. The motion of the jaws 3 is transmitted, by the coupling disk 7, to the jaws 5, which are likewise closed.

With the present arrangement as well as with that described according to Figs. 1 to 8, it is possible that the jaws 3 and 5 work simultaneously, or one after the other, according to the existing friction conditions and to the dimensions of the tool.

In the absence of a self-locking worm-gear, the slots 8 and 9 may be shaped conformably to a spiral curve or the like, to provide a self-locking system.

Instead of disposing the slots 8 and 9 in the coupling disk 7, and the pins 10 and 17 in the jaws 3 and 5 respectively, one may also reverse the relative positions of the said parts.

Having now described my invention, what I claim is:

1. A chuck comprising a housing, a disk of circular shape mounted in the housing, two sets of clamping members adapted to be jointly operated and each set arranged operatively one on each side of said disk, means interposed between said sets of clamping members and said disk so that the sets of jaws may be adjusted relative to each other, and means in the housing connected to operate one of the sets of clamping members to also operate the other set of clamping members by means of the disk.

2. A chuck according to claim 1, in which the last-mentioned means in the housing includes a disk having a squareshaped opening therein acting as a guide for one of the sets of clamping members.

3. A chuck according to claim 1, in which the last-mentioned means in the housing includes a disk having a square-shaped opening therein acting as a guide for one of the sets of clamping members, and in which the other set of clamping members is guided in a triangular-shaped opening in the housing to guide the other set of clamping members.

4. A chuck according to claim 1, in which the last-mentioned means in the housing includes a disk having a square-shaped opening therein acting as a guide for one of the sets of clamping members, and in which the other set of clamping members is guided in a triangular-shaped opening in the housing to guide the other set of clamping members, and the number of clamping members of one set in the square-shaped opening being four and the number of clamping members of the other set in the triangular-shaped opening being three.

5. A chuck according to claim 1, in which first-mentioned means includes pins mounted in and one for each clamping member and a series of slots mounted in each side of the disk into which the pins project and are guided therein.

6. A chuck according to claim 1, in which the last-mentioned means includes a disk enclosing one set of clamping members and having in its circumferential surface a worm-wheel, and in which a worm is provided meshing with said worm-wheel and supported in tangential position in respect of the worm-wheel by the housing.

References Cited in the file of this patent

UNITED STATES PATENTS

| 39,457 | Alden | Aug. 11, 1863 |
| 96,207 | Darling | Oct. 26, 1869 |
| 708,735 | Reid | Sept. 9, 1902 |
| 933,071 | Helman | Sept. 7, 1909 |
| 1,196,839 | Bodene | Sept. 5, 1916 |
| 2,557,486 | Weiss | June 19, 1951 |

FOREIGN PATENTS

| 426,782 | Great Britain | 1935 |
| 90,455 | Sweden | Nov. 9, 1937 |